(12) United States Patent
Muto

(10) Patent No.: US 10,635,106 B2
(45) Date of Patent: Apr. 28, 2020

(54) AUTOMATED DRIVING APPARATUS

(71) Applicant: DENSO CORPORATION, Kariya, Aichi-pref. (JP)

(72) Inventor: Shigehiro Muto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 44 days.

(21) Appl. No.: 15/118,251

(22) PCT Filed: Feb. 9, 2015

(86) PCT No.: PCT/JP2015/000590
§ 371 (c)(1),
(2) Date: Aug. 11, 2016

(87) PCT Pub. No.: WO2015/129175
PCT Pub. Date: Sep. 3, 2015

(65) Prior Publication Data
US 2017/0139414 A1 May 18, 2017

(30) Foreign Application Priority Data

Feb. 28, 2014 (JP) .................................. 2014-038287

(51) Int. Cl.
*G05D 1/00* (2006.01)
*G01S 19/42* (2010.01)
(Continued)

(52) U.S. Cl.
CPC .......... *G05D 1/0088* (2013.01); *B60W 30/12* (2013.01); *B62D 1/28* (2013.01); *B62D 15/025* (2013.01);
(Continued)

(58) Field of Classification Search
None
See application file for complete search history.

(56) References Cited

U.S. PATENT DOCUMENTS 4,278,142 A * 7/1981 Kono ................... G05D 1/0246
180/168
4,716,530 A * 12/1987 Ogawa ................. G05D 1/0234
180/168
(Continued)

FOREIGN PATENT DOCUMENTS

| JP | 2002163781 A | 6/2002 |
|----|--------------|--------|
| JP | 2008290680 A | 12/2008 |
| JP | 2009075933 A | 4/2009 |

*Primary Examiner* — Navid Ziaeianmehdizadeh
(74) *Attorney, Agent, or Firm* — Harness, Dickey & Pierce, P.L.C.

(57) ABSTRACT

An automated driving apparatus on a vehicle includes an acquirer and an automated driving control circuit. The acquirer detects a first marker that is detected when the vehicle passes through a first specified position on a road, and acquires the first specified position. The automated driving control circuit performs automated driving of the vehicle by controlling a traction actuator used to drive the vehicle based on a detection result from an onboard sensor on the vehicle. The automated driving control circuit determines whether to perform the automated driving, based on the detection result from the onboard sensor and information relating to the first specified position acquired by the acquirer under a condition that the first marker is detected by the acquirer.

13 Claims, 3 Drawing Sheets

(51) Int. Cl.
  *G05D 1/02* (2020.01)
  *G08G 1/00* (2006.01)
  *G08G 1/16* (2006.01)
  *B62D 1/28* (2006.01)
  *B62D 15/02* (2006.01)
  *B60W 30/12* (2020.01)

(52) U.S. Cl.
  CPC ............ *G01S 19/42* (2013.01); *G05D 1/0055* (2013.01); *G05D 1/0246* (2013.01); *G08G 1/00* (2013.01); *G08G 1/16* (2013.01); *G08G 1/167* (2013.01); *B60W 2420/42* (2013.01); *B60W 2550/402* (2013.01); *G05D 2201/0213* (2013.01)

(56) References Cited

U.S. PATENT DOCUMENTS

| | | | | |
|---|---|---|---|---|
| 5,369,591 | A * | 11/1994 | Broxmeyer | G05D 1/0261 180/167 |
| 5,828,968 | A * | 10/1998 | Iiboshi | G05D 1/0257 180/167 |
| 5,934,399 | A * | 8/1999 | Iiboshi | B60K 31/0008 180/169 |
| 5,957,983 | A * | 9/1999 | Tominaga | B62D 1/28 701/23 |
| 6,122,573 | A * | 9/2000 | Higashi | G05D 1/0261 180/167 |
| 7,174,836 | B2 * | 2/2007 | Marino | B61L 25/04 104/88.02 |
| 9,646,497 | B1 * | 5/2017 | Chatham | G08G 1/166 |
| 9,754,325 | B1 * | 9/2017 | Konrardy | G06Q 40/08 |
| 2011/0054791 | A1 * | 3/2011 | Surampudi | G01C 21/005 701/472 |
| 2011/0160949 | A1 * | 6/2011 | Kondo | G05D 1/0261 701/23 |
| 2015/0081211 | A1 * | 3/2015 | Zeng | B60W 30/0956 701/446 |
| 2015/0120124 | A1 * | 4/2015 | Bartels | B60W 50/10 701/23 |
| 2015/0241878 | A1 * | 8/2015 | Crombez | G05D 1/0088 701/23 |
| 2016/0178382 | A1 * | 6/2016 | Kojo | G01C 21/34 701/25 |
| 2017/0032197 | A1 * | 2/2017 | Sim | B60R 1/00 |
| 2017/0313253 | A1 * | 11/2017 | Hughes | B60R 1/12 |

* cited by examiner

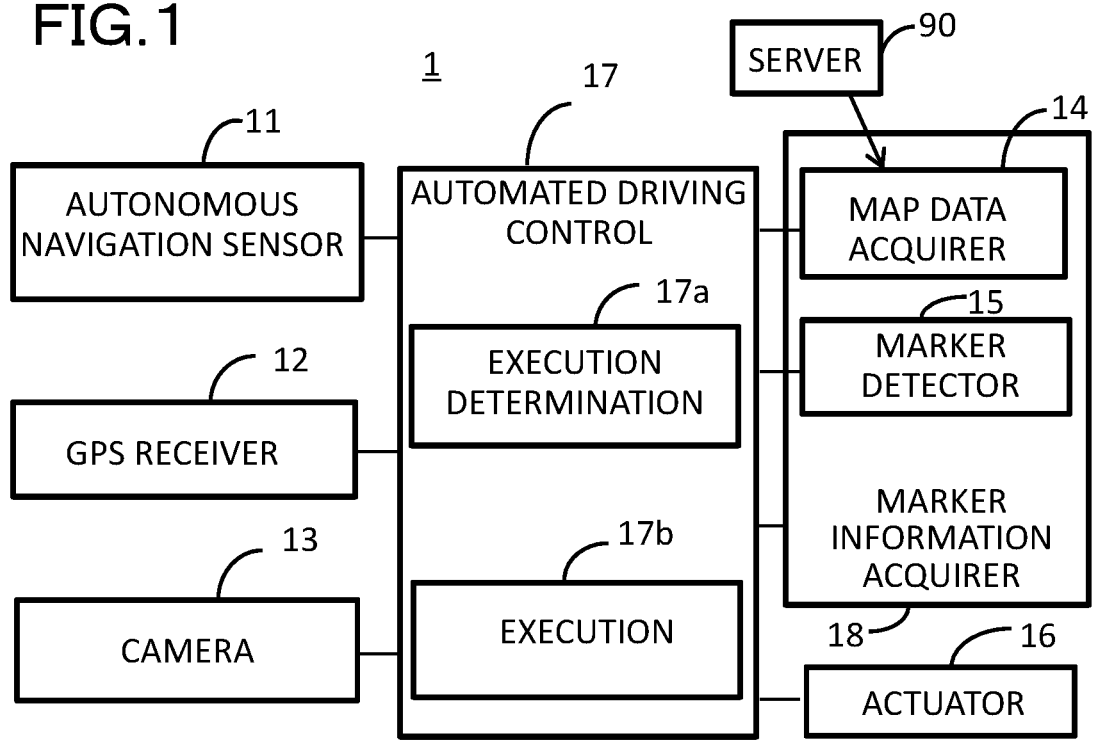
FIG. 1
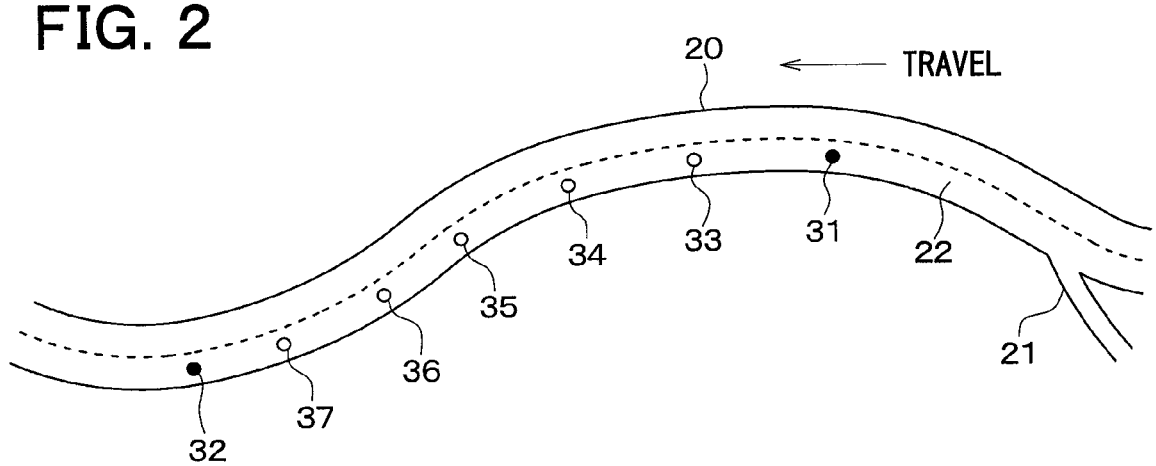
FIG. 2
FIG. 3

AUTOMATED DRIVING APPARATUS

CROSS REFERENCE TO RELATED APPLICATIONS

This application is a U.S. National Phase Application under 35 U.S.C. 371 of International Application No. PCT/JP2015/000590 filed on Feb. 9, 2015 and published in Japanese as WO 2015/129175 A1 on Sep. 3, 2015. This application is based on and claims the benefit of priority from Japanese Patent Application No. 2014-038287 filed on Feb. 28, 2014. The entire disclosures of all of the above applications are incorporated herein by reference.

TECHNICAL FIELD

The present disclosure relates to an automated driving apparatus.

BACKGROUND ART

There are conventionally known various technologies of an automated driving apparatus that automatically drives a vehicle using an onboard sensor such as a GPS receiver (e.g., see patent literature 1). The automated driving starts from a specified zone.

PRIOR ART LITERATURES

Patent Literature

Patent Literature 1: JP 2008-290680 A

SUMMARY OF INVENTION

However, there is not known a technology to determine whether an onboard sensor is capable of automated driving before the automated driving. A conventional automated driving apparatus therefore cannot determine whether the onboard sensor is normal and allows to start automated driving or the onboard sensor is abnormal and disallows to start automated driving.

It is an object of the present disclosure to provide a technology to determine whether an onboard sensor is capable of automated driving in an automated driving apparatus.

To achieve the above object, according to an example of the present disclosure, an automated driving apparatus on a vehicle is provided to include an acquirer and an automated driving control circuit. The acquirer detects a first marker that is detected when the vehicle passes through a first specified position on a road, and acquires the first specified position. The automated driving control circuit performs automated driving of the vehicle by controlling a traction actuator used to drive the vehicle based on a detection result from an onboard sensor on the vehicle. The automated driving control circuit determines whether to perform the automated driving, based on the detection result from the onboard sensor and information relating to the first specified position acquired by the acquirer under a condition that the first marker is detected by the acquirer.

Detection of the first marker equals detection of the vehicle passing through the first specified position. This signifies that acquiring the positional information about the first specified position allows the vehicle position to be specified accurately even without using detection results from the onboard sensors. Detection of the first marker can diagnose detection results from the onboard sensors using the information about the first specified position and can appropriately determine whether to perform the automated driving using the onboard sensors.

BRIEF DESCRIPTION OF DRAWINGS

The above and other objects, features and advantages of the present disclosure will become more apparent from the following detailed description made with reference to the accompanying drawings. In the drawings:

FIG. 1 is a configuration diagram illustrating an automated driving apparatus according to an embodiment of the disclosure;

FIG. 2 is a diagram illustrating a marker installed on a highway;

FIG. 3 is a diagram illustrating an example of marker information;

EMBODIMENTS FOR CARRYING OUT INVENTION

Figure 4:
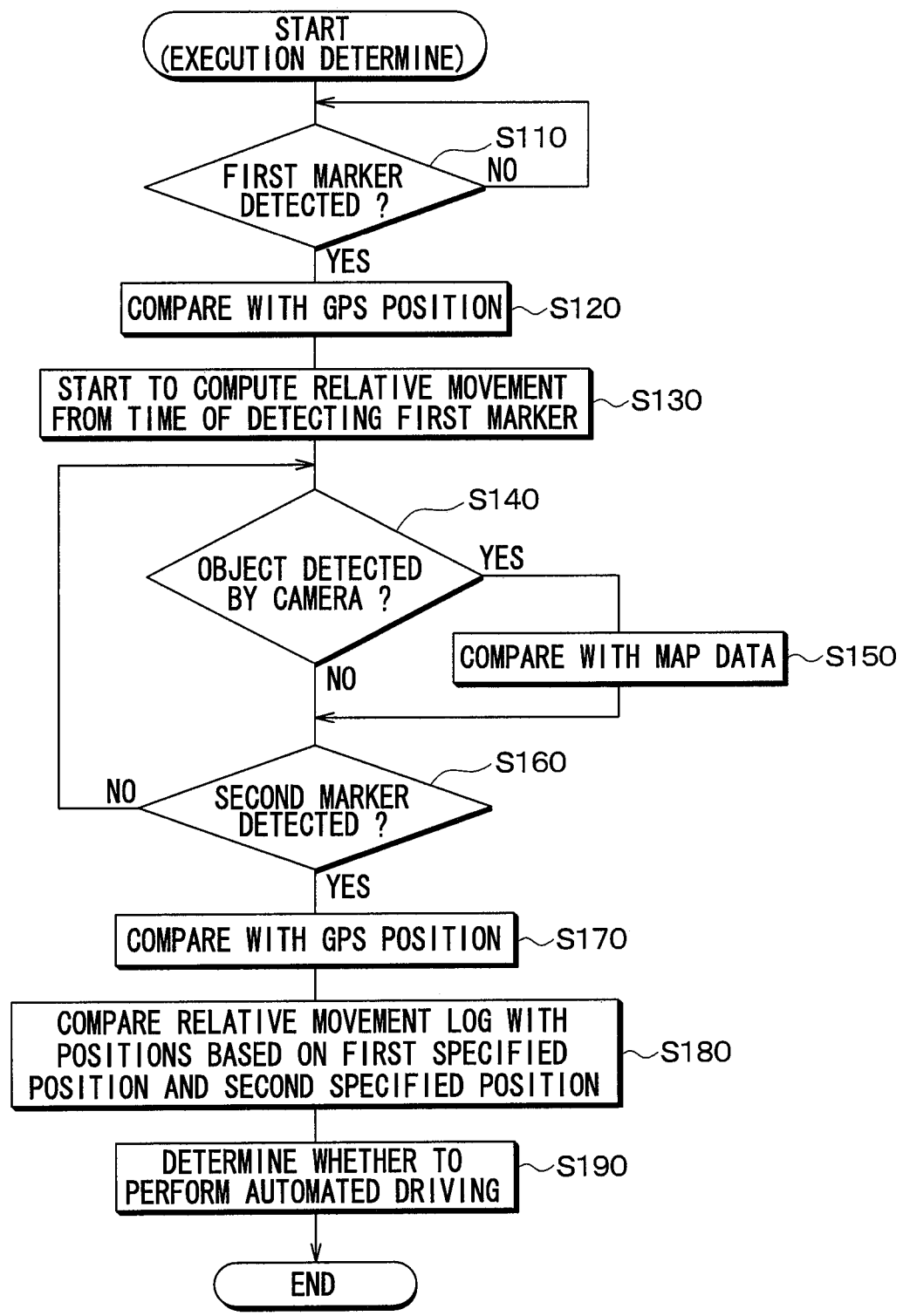
FIG. 4 is a flowchart illustrating an execution determination process.

The description below explains an embodiment of the present disclosure. As in FIG. 1, an automated driving apparatus 1 according to the embodiment is mounted on a vehicle and includes an autonomous navigation sensor 11, a GPS receiver 12, a camera 13, a map data acquirer 14, a marker detector 15, an actuator 16, and an automated driving control circuit 17 (also referred to as an automated driving controller).

The autonomous navigation sensor 11 includes a vehicle speed sensor, an acceleration sensor, and a yaw rate sensor according to known technologies. The autonomous navigation sensor 11 outputs information (such as a speed, an acceleration rate, and a yaw rate of the vehicle) to specify relative movement of the vehicle based on the autonomous navigation. The present application uses "information" as a countable noun as well as an uncountable noun.

The GPS receiver 12 receives data transmitted from several GPS satellites, specifies the current vehicle position based on the received data, and outputs the specified current position to the automated driving control circuit 17. Namely, the GPS receiver 12 specifies the current vehicle position using the satellite navigation.

The camera 13 captures a scene in the vicinity (more specifically, forward) of the vehicle and outputs the captured image to the automated driving control circuit 17. The marker detector 15 detects a marker installed on or near a road. FIG. 2 illustrates a highway 20 where markers 31 and 32 are installed. The highway 20 contains the first marker 31 embedded in the road surface at a position as long as a specified distance (e.g., 300 m) in the traveling direction away from a junction between an entrance ramp 21 and the highway 20. The second marker 32 is embedded in the road surface at a position approximately 1 km in the traveling direction away from the position where the first marker 31 is installed. The first marker 31 and the second marker 32 are embedded in a main-road lane (left lane 22 in the example of FIG. 2) that is legally regulated beforehand to be recommended for the use of automated driving. The first marker 31 and the second marker 32 are embedded in a lane dedicated to automated driving, if any, on the highway 20.

The first marker 31 and the second marker 32 repeatedly transmit a wireless signal (hereinafter referred to as a marker signal) based on the strength large enough to be received only by the marker detector of a vehicle passing through the position where the markers 31 and 32 are embedded. The signal strength needs to be received by the marker detector available within a range of 2 m from the second marker 32, for example.

The marker signal contains a marker ID that distinguishes the marker from the other markers. The first marker 31 transmits a marker signal containing a marker ID that uniquely identifies the first marker 31. The second marker 32 transmits a marker signal containing a marker ID that uniquely identifies the second marker 32.

The marker detector 15 receives the marker signals transmitted from the markers 31 and 32 when the vehicle mounted with the marker detector 15 passes through the positions where the markers 31 and 32 are embedded (respectively corresponding to a first specified position and a second specified position). The marker detector 15 outputs the marker ID contained in the received marker signal to the automated driving control circuit 17. The marker detector 15 is included in a marker information acquirer 18 (or a marker information detector and acquirer).

The map data acquirer 14 acquires the most recent map data from one or more servers 90 installed in a facility outside the vehicle via a known mobile communication path. The map data acquirer 14 stores the acquired map data in the memory. The map data to be acquired contains known information about road links and nodes.

Marker information 25 is contained in the map data acquired by the map data acquirer 14. The marker information 25 provided as a list of records as in FIG. 3. One record corresponds to a row of data in FIG. 3. Each record contains a marker ID and an absolute position coordinate (e.g., latitude, longitude, and altitude) for a specified position concerning one of markers that differ from each other. The map data acquirer 14 is included in the marker information acquirer 18 (or the marker information detector and acquirer).

The specified position for a marker is provided so that the marker detector 15 of the vehicle can receive a marker signal from the marker only when the vehicle passes through the specified position. According to the embodiment, the position to embed the marker 31 corresponds to a first specified position and the position to embed the marker 32 corresponds to a second specified position on the road.

The map data acquired by the map data acquirer 14 records information about a traffic sign between the first marker 31 and the second marker 32. The traffic sign information contains information about the order in which traffic signs appear between the first marker 31 and the second marker 32 in the traveling direction and the information about the contents of instructions (e.g., speed limit) the traffic signs provide.

The map data acquired by the map data acquirer 14 contains shape point data 33 through 37 (see FIG. 2) concerning a lane passing through the first specified position and the second specified position corresponding to the first marker 31 and the second marker 32, respectively. The shape point data provides data or information about coordinates (latitude, longitude, and altitude) at equally spaced positions from the first marker 31 to the second marker 32 along the lane.

The actuator 16 includes a driving actuator to generate vehicle driving torque (such as engine torque and motor torque), a braking actuator to generate vehicle braking torque, and a steering actuator to generate vehicle steering. The automated driving control circuit 17 controls the actuator 16.

The automated driving control circuit 17 according to the embodiment is available as a microcomputer including a CPU, RAM, and ROM. The CPU performs a specified program recorded in the ROM using the RAM as a work area to perform an execution determination process 17a and an execution process 17b. All or part of the software may be replaced by hardware components.

The execution determination process 17a determines whether to perform the execution process 17b. The execution process 17b controls the actuator 16 based on detection results from the autonomous navigation sensor 11, the GPS receiver 12, and the camera 13 and based on map data acquired by the map data acquirer 14. The execution process 17b thereby performs automated driving of a vehicle.

Automated driving of vehicle signifies automatically driving, braking, and steering a vehicle without occupant's manipulation. Specifically, the automated driving control circuit 17 performs operations (a) through (d) below during the execution process 17b.

(a) Specifying a current vehicle position and a travel speed vector by complementarily using detection results from the autonomous navigation sensor 11 and the GPS receiver 12 based on a known method.

(b) Detecting an inter-vehicular distance and relative speed, between (i) the vehicle and (ii) another vehicle ahead or an obstacle, based on a captured image (detection result) from the camera 13.

(c) Detecting the content of an instruction (e.g., speed limit) provided by a traffic sign (an example of an object) based on a captured image from the camera 13.

(d) Controlling the actuator 16 based on the results detected at (a) through (c) above to automatically drive, brake, and steer the vehicle so that the vehicle travels along a road in accordance with the instruction of the traffic sign without collision with a vehicle ahead or an obstacle.

Figure 5:
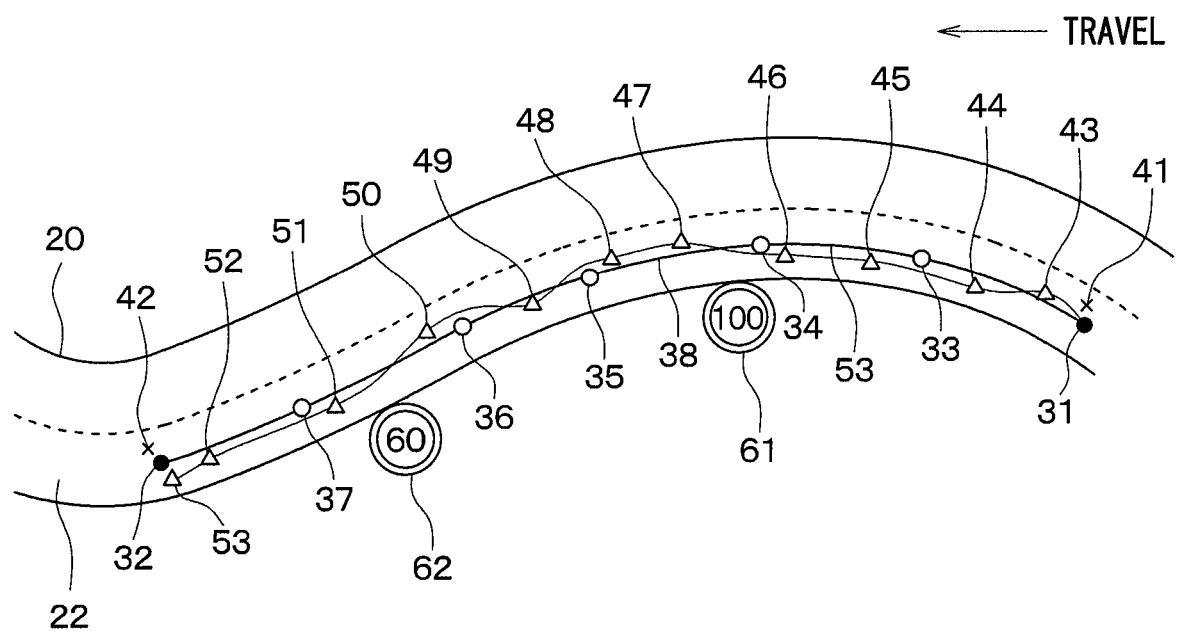
FIG. 5 is a diagram illustrating GPS positions, a relative movement locus, and traffic signs.

Operations of the execution determination process 17a will be described in detail with reference to a flowchart in FIG. 4 and an explanatory diagram in FIG. 5.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

The automated driving control circuit 17 may always perform the execution determination process 17a when the vehicle travels. Alternatively, the automated driving control circuit 17 may perform the execution determination process 17a only within a specified period (e.g., one hour) elapsed from the time when the map data acquirer 14 acquires the most recent map data from the server 90.

Alternatively, the automated driving control circuit 17 may always perform the execution determination process 17a only when the vehicle is located within a specified range containing the first specified position of the first marker 31 and the second specified position of the second marker 32 such as within a range of 5 km from the first specified position and 5 km from the second specified position. In this case, the vehicle location is determined based on a detection result from the autonomous navigation sensor 11 and a detection result from the GPS receiver 12.

When starting the execution determination process 17a, the automated driving control circuit 17 determines whether a marker is detected at S110. Namely, the automated driving control circuit 17 determines whether the marker detector 15 receives a marker signal from a marker and outputs a marker ID contained in the marker signal to the automated driving control circuit 17. The automated driving control circuit 17 repeats the determination at S110 until a marker is detected.

The vehicle enters the highway 20 from the ramp 21 according to the occupant's manual driving manipulation. The vehicle starts traveling the lane 22 according to the occupant's manual driving manipulation in order to start the automated driving. The automated driving control circuit 17 repeats the determination at S110 that no marker is detected before the vehicle passes through the first marker 31.

When the vehicle passes through the first marker 31, the marker detector 15 receives a marker signal transmitted from the first marker 31. The marker detector 15 outputs a marker ID in the received marker signal to the automated driving control circuit 17. The automated driving control circuit 17 determines that a marker is detected at S110, and then proceeds to S120.

At S120, the automated driving control circuit 17 compares an installation position 31 (first specified position 31) of the first marker 31 with a current vehicle position 41 (hereinafter referred to as a GPS position 41) the GPS receiver 12 detects and outputs at the time when the automated driving control circuit 17 determines that a marker is detected at S110.

The automated driving control circuit 17 specifies the specified position 31 (a, b, c) corresponding to the marker ID (of the first marker 31) output from the marker detector 15 based on the most recent marker information 25 in the most recent map data received by the map data acquirer 14. The automated driving control circuit 17 computes a difference between the specified position 31 and the GPS position 41. Based on the calculated difference, the automated driving control circuit 17 determines whether a distance from the specified position 31 to the GPS position 41 exceeds a first maximum distance (e.g., 20 m). The automated driving control circuit 17 determines that the diagnosis is unsuccessful if the distance exceeds the first maximum distance. The automated driving control circuit 17 determines that the diagnosis is successful if the distance does not exceed the first maximum distance. The automated driving control circuit 17 records the diagnosis as the first GPS evaluation in the RAM of the automated driving control circuit 17.

Detection of the first marker 31 equals detection of the vehicle passing through the specified position 31 for the first marker 31. The vehicle position can be thus specified accurately if the positional information about the specified position 31 is acquired, without using detection results from the onboard sensors 11 through 13. The vehicle has passed the specified position 31 when the first marker 31 is detected. The accuracy of the GPS receiver 12 is evaluated based on an error between the GPS position 41 and the specified position 31 when the first marker 31 is detected.

At S130, the automated driving control circuit 17 starts computing relative movement of the vehicle from the installation position 31, from the time to detect the first marker 31 (i.e., the time to successfully determine the detection at S110) based on a detection result from the autonomous navigation sensor 11 without using a detection result from the GPS receiver 12.

At S140, the automated driving control circuit 17 determines whether a new object (specifically, a traffic sign) to be used for the automated driving is detected in an image most recently captured by the camera 13. The automated driving control circuit 17 proceeds to S160 if determining that no such object is detected.

At S160, the automated driving control circuit 17 uses the same method as S100 to determine whether any marker is detected. The automated driving control circuit 17 returns to S140 when determining that no marker is detected. The automated driving control circuit 17 repeats the determinations at S140 and S160 until detecting a traffic sign in an image most recently captured by the camera or detecting a new marker.

A traffic sign 61 is contained in an image most recently captured by the camera 13 at a given time point while the vehicle continues to travel the lane 22 according to manual driving. The automated driving control circuit 17 uses a known image recognition technology to detect a traffic sign imposing a speed limit of 100 km per hour. Based on this detection, the automated driving control circuit 17 determines at S140 that a new traffic sign is detected in the image most recently captured by the camera 13. The automated driving control circuit 17 then proceeds to S150.

At S150, the automated driving control circuit 17 reads information about a traffic sign between the first marker 31 and the second marker 32. The information is contained in the most recent map data acquired by the map data acquirer 14. From this information, the automated driving control circuit 17 specifies the content of instruction provided by a traffic sign that appears first in the travel direction. The automated driving control circuit 17 determines whether the specified content of instruction equals the content of instruction of the traffic sign, namely, "the speed limit of 100 km per hour," detected in the image most recently captured by the camera. The automated driving control circuit 17 determines that the diagnosis is successful if the contents of instruction are equal to each other. The automated driving control circuit 17 determines that the diagnosis is unsuccessful if the contents of instruction differ from each other. The automated driving control circuit 17 records this diagnosis result as a first camera evaluation in the RAM of the automated driving control circuit 17. After S150, the automated driving control circuit 17 proceeds to S160.

As already described earlier, the automated driving control circuit 17 can accurately specify the vehicle position (specified position 31) at the time of detecting the marker 31 without using detection results from the onboard sensors 11 through 13. The same applies to the vehicle position (specified position 32) at the time of detecting the marker 32 to be described later. The accuracy of the camera 13 is evaluated based on the capability of correctly detecting a traffic sign (corresponding to an example of information about the specified positions 31 and 32) from an image captured by the camera 13 when the traffic sign is identified as being located forward of the specified position 31 and backward of the specified position 32 according to the map data.

Suppose that a roadway sign is once detected based on an image captured by the camera 13. In such a case, the automated driving control circuit 17 does not determine at S140 that the roadway sign is detected even if it is detected again. When the vehicle thereafter continues to travel the lane 22 according to manual driving, the automated driving control circuit 17 repeats the determinations at S140 and S160 until determining that a traffic sign 62 is detected. The traffic sign 62 is contained in an image most recently captured by the camera 13 at a given time point. From this image, the automated driving control circuit 17 detects a traffic sign indicating the speed limit of 60 km per hour. Based on this detection, the automated driving control circuit 17 determines at S140 that a new traffic sign is detected in the image most recently captured by the camera 13. The automated driving control circuit 17 then proceeds to S150.

At S150, the automated driving control circuit 17 reads the information about the traffic sign from the most recent map data the map data acquirer 14 acquired. From this information, the automated driving control circuit 17 specifies the content of instruction provided by a traffic sign that appears second in the travel direction. The automated driving control circuit 17 determines whether the specified content of instruction equals the content of instruction of the traffic sign, namely, "the speed limit of 60 km per hour," detected in the image most recently captured by the camera. The automated driving control circuit 17 determines that the diagnosis is successful if the contents of instruction are equal to each other. The automated driving control circuit 17 determines that the diagnosis is unsuccessful if the contents of instruction differ from each other. The automated driving control circuit 17 records this diagnosis result as a second camera evaluation in the RAM of the automated driving control circuit 17. The purpose of this process is already described. After S150, the automated driving control circuit 17 proceeds to S160.

The automated driving control circuit 17 continues to compute the relative movement started at S130 while performing the process at S140, S150, and S160. This process records a relative movement log 43 through 53 starting from the installation position 31 in the RAM of the automated driving control circuit 17 while the vehicle travels.

When the vehicle passes through the second marker 32, the marker detector 15 receives a marker signal transmitted from the second marker 32 and outputs a marker ID in the received marker signal to the automated driving control circuit 17. The automated driving control circuit 17 determines at S160 that the marker is detected. The automated driving control circuit 17 then proceeds to S170.

At S170, the automated driving control circuit 17 compares an installation position 32 (second specified position 32) of the second marker 32 with a current vehicle position 42 (hereinafter referred to as a GPS position 42) the GPS receiver 12 detects and outputs at the time when the automated driving control circuit 17 determines that a marker is detected at S160.

Specifically, the automated driving control circuit 17 specifies the second specified position 32 (d, e, f) corresponding to the marker ID (of the second marker 32) output from the marker detector 15 based on the marker information 25 in the most recent map data received by the map data acquirer 14. The automated driving control circuit 17 computes a positional difference between the second specified position 32 and the GPS position 42. Based on the computed difference, the automated driving control circuit 17 determines whether the distance from the second specified position 32 to the GPS position 42 exceeds the first maximum distance. The automated driving control circuit 17 determines that the diagnosis is unsuccessful if the distance exceeds the first maximum distance. The automated driving control circuit 17 determines that the diagnosis is successful if the distance does not exceed the first maximum distance. The automated driving control circuit 17 records this diagnosis result as a second GPS evaluation in the RAM of the automated driving control circuit 17. The purpose of this process is already described at S120. The accuracy of the GPS receiver 12 can be evaluated based on an error between the GPS position 42 and the specified position 32 when the second marker 32 is detected.

The relative movement log 43 through 53 is acquired up to the present since the automated driving control circuit 17 starts computing the relative movement at S130. At S180, the automated driving control circuit 17 compares the relative movement log 43 through 53 with the installation positions of the first marker 31 and the second marker 32.

Specifically, based on the marker information 25 in the most recent map data received by the map data acquirer 14, the automated driving control circuit 17 specifies the second specified position 32 (d, e, f) corresponding to the marker ID (of the second marker 32) output from the marker detector 15. The automated driving control circuit 17 computes a difference between the second specified position 32 and the last position 53 in the log. Based on the computed difference, the automated driving control circuit 17 determines whether the distance from the specified position 32 to the position 53 exceeds the second maximum distance. The position 53 corresponds to the relative movement log at the time when the automated driving control circuit 17 determines detection of the second marker 32 at S160. The automated driving control circuit 17 determines that the diagnosis is unsuccessful if the distance exceeds the second maximum distance. The automated driving control circuit 17 determines that the diagnosis is successful if the distance does not exceed the second maximum distance. The automated driving control circuit 17 records this diagnosis result as a dead-reckoning navigation evaluation in the RAM of the automated driving control circuit 17.

As described, the automated driving control circuit 17 can accurately specify the vehicle positions (specified positions 31 and 32) at the time of detecting the markers 31 and 32 without using detection results from the onboard sensors 11 through 13. Suppose that the dead-reckoning navigation continues to compute relative movement of the vehicle from the specified position 31 and computes the last position 54 of the relative movement at the time when the second marker 32 is detected. In this case, the accuracy of the autonomous navigation sensor 11 is evaluated based on an error between the position 54 and the specified position 32.

At S180, the automated driving control circuit 17 specifies the second specified position 32 (d, e, f) as above. The automated driving control circuit 17 reads the shape point data 33 through 37 from the most recent map data acquired by the marker detector 15. The shape point data 33 through 37 range from the first specified position 31 to the second specified position 32 passing through the lane 22. The automated driving control circuit 17 computes a route 38 linearly that connects the first specified position 31, the shape point data 33 through 37, and the second specified position 32 in this order. The automated driving control circuit 17 computes shortest distances from the relative movement log 43 through 53 to the route 38. The automated driving control circuit 17 determines whether an average value (corresponding to an example of statistically representative value) of the computed shortest distances exceeds the second maximum distance. The automated driving control circuit 17 determines that the diagnosis is successful if the average value exceeds the second maximum distance. The automated driving control circuit 17 determines that the diagnosis is unsuccessful if the average value does not exceed the second maximum distance. The diagnosis result is recorded in the RAM of the automated driving control circuit 17, as a dead-reckoning navigation evaluation.

As already described earlier, the automated driving control circuit 17 can accurately specify the vehicle positions (specified positions 31 and 32) at the time of detecting the markers 31 and 32 without using detection results from the onboard sensors 11 through 13. The accuracy of the autonomous navigation sensor 11 is evaluated based on an error between the route 38 and the relative movement log 43 through 53 for the vehicle in the dead-reckoning navigation starting from the specified position 31.

The second maximum distance may be predetermined as the autonomous navigation accuracy needed for the automated driving so as to find an error corresponding to be smaller than or equal to 1/20 of a difference between the vehicle width and the road width. When a typical vehicle width is 2 m and a typical road width is 3 m, the second maximum distance is found by (3 m−2 m)/20=5 cm.

At S190, the automated driving control circuit 17 determines whether to perform the automated driving using the onboard sensors 11 through 13, based on the comparison results at S120, S150, S170, and S180, namely, based on the first GPS evaluation, the first camera evaluation, the second camera evaluation, the second GPS evaluation, and the dead-reckoning navigation evaluation.

The automated driving control circuit 17 may determine not to perform the automated driving using the onboard sensors 11 through 13 if only one of the five evaluations is unsuccessful. The automated driving control circuit 17 may determine to perform the automated driving using the onboard sensors 11 through 13 if all the evaluations are successful.

The automated driving control circuit 17 may determine to perform the automated driving using the onboard sensors 11 through 13 if a half or more of the five evaluations are successful. Otherwise, the automated driving control circuit 17 may determine not to perform the automated driving using the onboard sensors 11 through 13.

The automated driving control circuit 17 performs the execution process 17b if determining to perform the automated driving using the onboard sensors 11 through 13. The vehicle travels the lane 22 based on the automated driving after passing through the second marker 32. The automated driving control circuit 17 may use an unshown audio output apparatus to notify an occupant that the automated driving is unavailable if determining not to perform the automated driving using the onboard sensors 11 through 13.

The automated driving control circuit 17 according to the embodiment determines whether to perform the execution process 17a (automated driving control), based on detection of the first and second markers 31 and 32, detection results from the onboard sensors 11 through 13, and information about the specified positions 31 and 32 acquired by the marker detector 15.

The information about the specified positions 31 and 32 includes the coordinate at the specified position in the marker information 25, the content of a traffic sign between the specified position 31 and the specified position 32, and the shape point data 33 through 37 on the lane 22 between the specified position 31 and the specified position 32.

Detection of the first and second markers 31 and 32 equals detection of the vehicle passing through the first and second specified positions 31 and 32. Successful acquisition of positional information at the specified positions 31 and 32 can accurately specify the vehicle position without using detection results from the onboard sensors 11 through 13. Detection of the markers 31 and 32 can diagnose detection results from the onboard sensors 11 through 13 using the positional information about the specified positions 31 and 32 and can appropriately determine whether to perform the automated driving using the onboard sensors 11 through 13.

OTHER EMBODIMENTS

The present disclosure is not limited to the embodiment but may be appropriately modified within a scope of the appended claims.

(First Modification)

According to the embodiment, the markers 31 and 32 are provided for the lane 22 on the main road of the highway 20. The first and second markers may be provided for the other places. For example, the first and second markers may be provided for the entrance ramp 21 of the highway 20. The first and second markers may be provided for an ordinary road instead of the highway 20.

The first and second maximum distances may be given larger values when the markers 31 and 32 are provided for a highway than when the markers 31 and 32 are provided for an ordinary road. This is because a vehicle tends to move at a high speed on a highway, requiring more highly accurate automated driving.

The first and second markers may be provided not only on a road surface but also above or on the side of a road. In this case, the marker's installation position may differ from the marker's specified position.

(Second Modification)

The embodiment uses the GPS receiver 12 as an apparatus to specify the current vehicle position based on the satellite navigation. An apparatus other than the GPS receiver 12 may be used. The apparatus may receive data transmitted from several GLONASS' or quasi-zenith satellites and specify the current vehicle position based on the received data.

(Third Modification)

The embodiment uses the information about the first specified position and the second specified position corresponding to the first marker 31 and the second marker 32. The information may or may not be acquired as part of the map data. The information about the first and second specified positions corresponding to the markers 31 and 32 may be contained in a marker signal that is transmitted from each marker and is received by the automated driving apparatus 1. In this case, the marker detector 15 provides a function to acquire the information about the first and second specified positions.

(Fourth Modification)

According to the embodiment, the markers 31 and 32 are each provided as a wireless transmitter. However, the markers 31 and 32 are not limited thereto. The markers 31 and 32 may be provided as specifically shaped patterns painted on a road. Each marker pattern also contains a pattern to represent the marker ID of the marker. In this case, the marker detector 15 is replaced by a camera that captures the road surface.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An automated driving apparatus mounted on a vehicle, comprising:
a marker information acquirer configured to
detect a first marker, the first marker being detected when the vehicle passes through a first specified position on a road, and
acquire first positional information relating to the first specified position; and
an automated driving control circuit that performs automated driving of the vehicle by controlling a traction actuator used to drive the vehicle based on a detection result from an onboard sensor mounted on the vehicle, wherein
the automated driving control circuit is configured to:
determine a position of the vehicle specified by the onboard sensor at a first time when the first marker is detected;
calculate a difference between (i) the first specified position and (ii) the position specified by the onboard sensor at the first time when the first marker is detected;
determine whether to perform the automated driving based at least in part on the calculated difference; and
determine not to perform the automated driving, when the automated driving control circuit determines that the calculated difference exceeds a maximum distance.

2. The automated driving apparatus according to claim 1, wherein:
the onboard sensor includes a satellite navigation receiver that receives information to specify the position of the vehicle from a satellite; and
the automated driving control circuit is further configured, in cases that the first marker is detected, to:
perform an accuracy evaluation of the satellite navigation receiver, based on a comparison between (i) the first positional information relating to the first specified position and (ii) the position of the vehicle specified based on the information received form the satellite by the satellite navigation receiver at the first time when the first marker is detected, and
determine whether to perform the automated driving based on an evaluation result of the accuracy evaluation of the satellite navigation receiver.

3. The automated driving apparatus according to claim 1, wherein:
the marker information acquirer
detects a second marker being detected when the vehicle passes through a second specified position on the road, and
acquires second positional information relating to the second specified position;
the automated driving control circuit is further configured to determine that a position of the vehicle at a second time when the second marker is detected is specified to be the second specified position in response to detection of the second marker;
the onboard sensor includes an autonomous navigation sensor that outputs information to specify relative movement of the vehicle based on autonomous navigation;
in cases that the first marker is detected by the marker information acquirer, the automated driving control circuit starts computing relative movement of the vehicle from the first time when the first marker is detected, based on the autonomous navigation; and the automated driving control circuit is further configured, in cases that the second marker is subsequently detected,
to perform an accuracy evaluation of the autonomous navigation sensor, based on comparison between
(i) the first positional information relating to the first specified position and the second positional information relating to the second specified position, and
(ii) a log of the relative movement of the vehicle from the first time when the first marker is detected to the second time when the second marker is detected, and
to determine whether to perform the automated driving based on an evaluation result of the accuracy evaluation of the autonomous navigation sensor.

4. The automated driving apparatus according to claim 1, wherein:
the marker information acquirer
detects a second marker being detected when the vehicle passes through a second specified position on the road, and
acquires second positional information relating to the second specified position, and information about an object located in between the first specified position and the second specified position;
the automated driving control circuit is further configured to determine that a position of the vehicle at a second time when the second marker is detected is specified to be the second specified position in response to detection of the second marker;
the onboard sensor includes a camera to capture an image of a peripheral area surrounding the vehicle; and
the automated driving control circuit is further configured to perform an accuracy evaluation of the camera based on comparison between
(i) the information about the object located in between the first specified position and the second specified position acquired by the marker information acquirer, and
(ii) information about an object contained in the image captured by the camera from the first time when the first marker is detected to the second time when the second marker is detected, and
to determine whether to perform the automated driving based on an evaluation result of the accuracy evaluation of the camera.

5. The automated driving apparatus according to claim 1, wherein:
when the automated driving control circuit determines that the calculated difference exceeds the maximum distance, the automated driving control circuit determines not to perform the automated driving and notifies an occupant that the automated driving is unavailable.

6. An automated driving apparatus mounted on a vehicle, comprising:
a marker detector configured to detect a first marker, the first marker being detected when the vehicle passes through a first specified position on a road and first positional information relating to the first specified position being stored in a memory; and
an automated driving control circuit that performs automated driving of the vehicle by controlling a traction actuator used to drive the vehicle based on a detection result from an onboard sensor mounted on the vehicle, wherein the automated driving control circuit is further configured, in response to detection of the first marker, to:
determine that a position of the vehicle specified by the onboard sensor at a first time when the first marker is detected;
calculate a difference between (i) the first specified position stored in the memory and (ii) the position of the vehicle specified by the onboard sensor at the first time when the first marker is detected; and
determine whether to perform the automated driving, based on the calculated difference, wherein when the automated driving control circuit determines that the calculated difference exceeds a threshold, the automated driving control circuit does not perform the automated driving.

7. The automated driving apparatus according to claim 6, wherein:
the onboard sensor includes a satellite navigation receiver that receives information to specify a position of the vehicle from a satellite; and
the automated driving control circuit is further configured, in cases that the first marker is detected, to:
perform an accuracy evaluation of the satellite navigation receiver, based on a comparison between (i) the first positional information relating to the first specified position and (ii) the position of the vehicle specified based on the information received from the satellite by the satellite navigation receiver at the first time when the first marker is detected; and
determine whether to perform the automated driving based on an evaluation result of the accuracy evaluation of the satellite navigation receiver.

8. The automated driving apparatus according to claim 6, wherein:
the marker detector detects a second marker being detected when the vehicle passes through a second specified position on the road, second positional information relating to the second specified position being stored in the memory; and
the automated driving control circuit is further configured to determine that a position of the vehicle at a second time when the second marker is detected is specified to be the second specified position in response to detection of the second marker;
the onboard sensor includes an autonomous navigation sensor that outputs information to specify relative movement of the vehicle based on autonomous navigation; and
the automated driving control circuit is further configured, in cases that the first marker is detected and the second marker is detected, to:
compute a relative movement of the vehicle from the first time when the first marker is detected to the second time when the second marker is detected, based on the autonomous navigation,
perform an accuracy evaluation of the autonomous navigation sensor, based on a comparison between
(i) the first positional information relating to the first specified position and the second positional information relating to the second specified position and
(ii) a log of the relative movement of the vehicle from the first time when the first marker is detected to the second time when the second marker is detected, and determine whether to perform the automated driving based on an evaluation result of the accuracy evaluation of the autonomous navigation sensor.

9. The automated driving apparatus according to claim 6, wherein:
the marker detector detects a second marker being detected when the vehicle passes through a second specified position on the road, wherein second positional information relating to the second specified position and information about an object located in between the first specified position and the second specified position are stored in the memory;
the automated driving control circuit is further configured to determine that a position of the vehicle at a second time when the second marker is detected is specified to be the second specified position in response to that the second marker is detected;
the onboard sensor includes a camera to capture an image of a peripheral area surrounding the vehicle; and
in cases that the first marker is detected and the second marker is detected,
the automated driving control circuit is further configured to:
perform an accuracy evaluation of the camera based on a comparison between
(i) the information about the object located in between the first specified position and the second specified position and
(ii) information about an object contained in the image captured by the camera from the first time when the first marker is detected to the second time when the second marker is detected, and
to determine whether to perform the automated driving based on an evaluation result of the accuracy evaluation of the camera.

10. The automated driving apparatus according to claim 6, wherein:
when the automated driving control circuit determines that the calculated difference exceeds a maximum distance, the automated driving control circuit determines not to perform the automated driving and notifies an occupant that the automated driving is unavailable.

11. An automated driving system, comprising:
an onboard camera provided on a vehicle, the onboard camera being configured to detect a marker disposed on a road by capturing an image of a peripheral area surrounding the vehicle;
an automated driving control circuit connected to the onboard camera and configured to perform automated driving of the vehicle by controlling an actuator used to drive the vehicle based on
(i) a detection result from an onboard sensor acquiring vehicle position information by using at least one of satellite navigation and autonomous navigation,
(ii) a detection result from the onboard camera, and
(iii) map data including marker position information relating to a position of the marker; and
a processor configured to:
acquire the vehicle position information acquired by the onboard sensor at a time when the marker is detected by the onboard camera, and acquire the marker position information included in the map data; and
calculate a difference between (i) the vehicle position information acquired by the onboard sensor and (ii) the marker position information included in the map data,
the processor determining whether to permit the automated driving circuit to perform the automated driving based at least in part on the calculated difference, wherein when the processor determines that the calculated difference exceeds a threshold, the processor determines not to permit the automated driving circuit to perform the automated driving.

12. The automated driving system according to claim 11, wherein:
  the map data includes (i) first marker position information relating to a position of a first marker, (ii) second marker position information relating to a position of a second marker, (iii) shape point data corresponding to a lane from the first marker to the second marker;
  in response to that the first marker being detected by the onboard camera at a first time and the second marker being detected by the onboard camera at a second time, the processor performs a comparison between (i) the shape point data corresponding to the lane from the first marker to the second marker included in the map data, and (ii) a log of the vehicle position information acquired by the onboard sensor from the first time to the second time; and
  the processor determines whether to permit the automated driving circuit to perform the automated driving based at least in part on the comparison.

13. The automated driving system according to claim 11, wherein:
  when the automated driving control circuit determines that the calculated difference exceeds a maximum distance, the automated driving control circuit determines not to perform the automated driving and notifies an occupant that the automated driving is unavailable.

* * * * *